Patented Jan. 18, 1949

2,459,226

UNITED STATES PATENT OFFICE 2,459,226

PRODUCTION OF PYRAZOLE-5-ONES

John David Kendall and Douglas James Fry, Ilford, England, assignors to Ilford Limited, Ilford, Essex, England, a British company No Drawing. Application November 29, 1945, Serial No. 631,791. In Great Britain December 1, 1944

10 Claims. (Cl. 260—304)

This invention relates to the production of organic compounds and particularly to the production of pyrazole-5-ones.

When a compound containing a reactive methylene group, i. e. a compound which may be represented by the general formula $R_1$—$CH_2$—$R_2$ (where $R_1$ and $R_2$ are organic groupings at least one of which contains a group adjacent to the $CH_2$ group which renders the $CH_2$ group reactive) and which is capable of forming a sodium derivative, is converted to a mono alkali, e. g. sodium, salt and reacted with an α-halogenated carboxylic acid ester, i. e., a compound of the formula $$XCH_2.COOR_3$$

(where X is a halogen atom and $R_3$ is hydrogen or a hydrocarbon group), a reaction takes place according to the following equation:

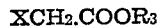
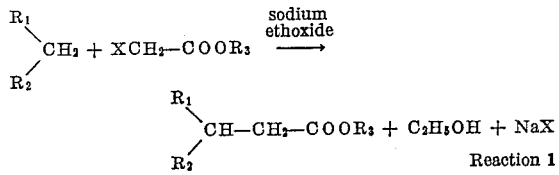

Reaction 1

In this equation the formation of the sodium derivative is shown as being effected in situ by carrying out the reaction in the presence of sodium ethoxide.

It has now been discovered that when a compound of the formula

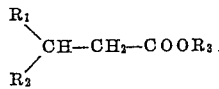

is reacted in the presence of a weak base with a diazonium compound (i. e. a compound of the formula $R_4N_2Cl$ where $R_4$ is an aryl residue) or is reacted in the presence of a strong base with a quantity less than two molecular equivalents (and preferably not greater than one molecular equivalent) of such diazonium compound, reaction takes place with the elimination of one of the groups $R_1$ and $R_2$, thus

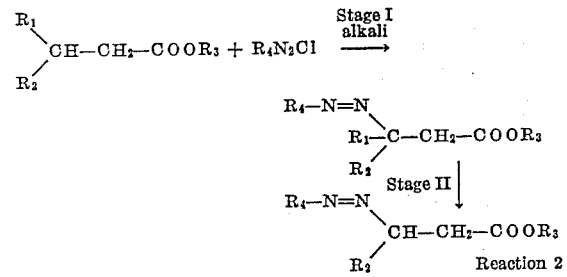

Reaction 2

In some cases the reaction proceeds only to stage I and its completion through stage II requires a heat treatment with a stronger alkali.

The product of stage II, even if it does not separate spontaneously, can easily be separated from the reaction mixture, for example by extraction with ethyl ether. On standing or heating it rearranges itself to give the corresponding pyrazole-5-one, thus:

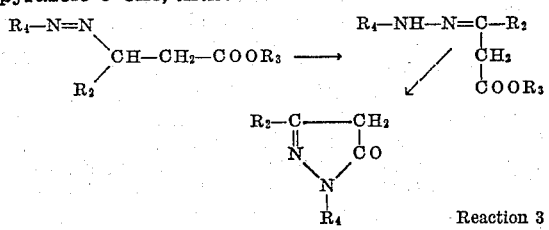

Reaction 3

In these formulae it has been assumed that in reaction 2 the group $R_1$ is eliminated. Actually, of course, $R_1$ and $R_2$ are not distinguished in reaction 1 and the question of which group is removed depends on the actual nature of the groups $R_1$ and $R_2$, and on the particular conditions of reaction.

The groups $R_1$ and $R_2$ may be, for example, —CN, —COOR, —COR or —CONHR where R is hydrogen or a hydrocarbon group.

According to the present invention, therefore, pyrazole-5-ones are prepared by reacting a diazonium compound with the condensation product of a mono-alkali metal derivative of a compound containing a reactive methylene group with a monohalogenated acetic acid or ester, the said reaction being effected (a) with the reactants in any molecular proportions (preferably approximately equimolecular) in the presence of a weak base and completed, if necessary, by heating in the presence of a stronger base, or (b) with less than two molecular equivalents of the diazonium compound per molecular equivalent of the condensation product in the presence of a strong base, separating the product obtained and allowing the product to stand at room temperature or elevated temperature to permit molecular rearrangement.

The term "molecular equivalent" used above refers to molecular equivalent per diazo group present in the diazonium compound. Thus the maximum quantity of diazonium compound containing two diazo groups permissible for use in the presence of a strong base ((b) above) is one molecular weight for each molecular weight of the condensation product. Where diazonium compounds containing greater numbers of diazo groups are employed the quantity of diazonium compound will be correspondingly decreased.

There is a tendency in the production of pyrazole-5-ones according to this invention for the simultaneous formation of an azo dye, but the conditions of reaction specified above are such that this tendency is reduced as much as possible. If it is desired to produce the azo dye as the main product, it is preferable to use a strong base and at least two molecular equivalents of the diazonium compound, and this reaction forms the subject of our co-pending U. S. application Serial No. 631,792 filed on even date herewith. Using a weak base, even in a quantity in excess of that required to neutralize both the free acid present in the diazonium solution employed and the anion of the diazonium salt, the pyrazole-5-one is usually at most only slightly contaminated with the azo dye, whatever quantity of diazonium compound is used. Using a strong base, however, the quantity of diazonium compound employed is of especial importance; it should not exceed two molecular equivalents and preferably should not exceed one molecular equivalent for the reason that as the quantity of diazonium compound is increased the tendency to the formation of the azo dye is also increased.

Examples of reagents suitable for producing the initial condensation product are, as the reactive methylene compound, compounds such as malonic ester, aceto acetic ester, cyanacetic ester, acetyl acetone or a derivative such as acetoacetanilide in which the reactive methylene group is still present and, as the α-halogenated carboxylic acid or ester, chloracetic acid, chloracetic ethyl ester, or the corresponding brom or iodo derivatives to these. The condensation should be effected with the reactive methylene compound in the form of its mono-alkali-metal salt, and this can conveniently be achieved by effecting the condensation in the presence of an alkali metal ethoxide, e. g. sodium ethoxide. As examples of the products obtained using chloracetic ethyl ester, these are:

(a) From malonic ester the compound

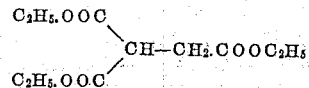

(b) From acetoacetic ethyl ester the compound

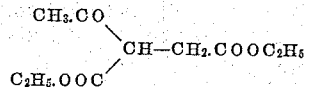

(c) From cyanacetic ethyl ester the compound

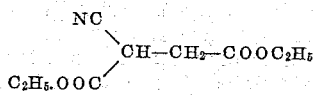

(d) From acetyl acetone the compound

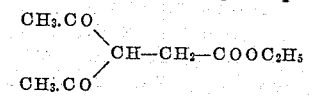

(e) From acetoacetanilide the compound

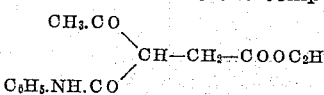

To produce the pyrazole-5-one in accordance with this invention the condensation product is treated with, for preference, one molecular equivalent, of a diazonium compound, in the presence of a base. The base employed may be inorganic or organic. Suitable organic bases are pyridine and triethylamine. Weak inorganic bases which may be employed are sodium carbonate and borax. Alkali metal salts of organic acids, such as sodium acetate may also be employed. Strong bases which may be employed are caustic soda, caustic potash, sodium ethoxide and the like. Reaction takes place at the CH grouping, and one of the two substituents attached thereto in the original reactive methylene compound is, in the final product, removed. For example, in the case of the products of (a) and (d) above, one of the two similar groupings attached to the CH grouping is removed; in the case of the product of (b) and (e) a CH$_3$CO grouping is removed, and in the case of the product of (c) a COOC$_2$H$_5$ grouping is removed.

The product usually separates out and on being allowed to stand, or being heated, rearranges to the corresponding pyrazole-5-one.

Typical pyrazole-5-ones which may be produced by the process of this invention, using benzene diazonium chloride as a typical diazonium compound, are:

From the product of (a) and (b) the compound

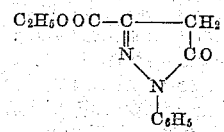

From the product of (c) the compound

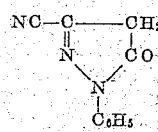

From the product of (d) the compound

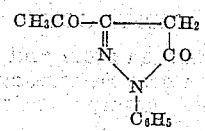

From the product of (e) the compound

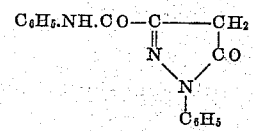

As the pyrazole-5-ones are generally more easily soluble in alkali than the azo dyestuffs with which they may be contaminated, purification of such pyrazole-5-ones may usually be effected quite simply by filtering the alkali solution thereof and re-precipitating the pyrazole-5-one by the addition of acid.

Whilst benzene diazonium chloride has been instanced above as a suitable diazonium compound, all the well known diazonium compounds can be similarly employed. As representative examples of suitable diazonium compounds there may be mentioned the diazonium chlorides derived from the following amines: aniline, toluidine, xylidine, naphthionic acid, α-naphthylamine, β-naphthylamine, p-aminobenzyl dimethylamine, m-aminophenyl dimethylamine, m-nitraniline, p-aminophenol, sulphanilic acid, the various amino naphthol sulphonic acids, amino azo benzene and its sulphonic acids, benzidine, tolidines, p.p.diamino stilbene, p.p.diamino diphenylamine, p.p-diamino carbazole, p.p-diamino fluorene, p.p-diamino azobenzene, p-phenylene diamine, 1:4 and 1:5 diamino naphthalenes, and amines containing heterocyclic rings such as dehydrothio-p-toluidine or its sulphonic acid. Other diazo compounds commonly used in azo dye formation may also be employed.

The pyrazole-5-ones obtained according to the present invention may be employed as dyestuff derivatives. For example, they may be reacted with diazonium compounds (which may be the same as, or different from, those used in their production) to produce azo dyestuffs; or they may be employed in the production of azomethine dyestuffs, for example in processes of colour photography where they may be included in a photographic silver halide emulsion or in a solution of an aromatic primary amino developing agent and be converted to an azo-methine dyestuff by reaction with the oxidation products of such a photographic developing agent formed during the development of such an emulsion with such a developing agent. Such pyrazole-5-ones may also be employed in the formation of merocyanine dyes, e. g. in the processes of British patent specifications Nos. 555,936, 553,144, 549,202 and 544,647.

The following Examples serve to illustrate the invention:

EXAMPLE 1

*Preparation of 1-phenyl-3-carbethoxy-pyrazole-5-one*

Aniline ($\frac{1}{10}$ mol) was dissolved in 50 cc. of dilute hydrochloric acid (5 N) and cooled to 0° C. To this solution was added sodium nitrite ($\frac{1}{10}$ mol) in 25 cc. water. The solution was stirred for half an hour and then slowly added to a solution of ethyl aceto succinate ($\frac{1}{10}$ mol) (prepared by the method described in "Organic Syntheses," Volume XIV at page 38) in 60 cc. sodium hydroxide solution (2.5 N), the reaction mixture being cooled in ice. The mixture was stirred for two hours, filtered (to remove some azo dye formed) and the filtrate acidified with concentrated hydrochloric acid. The crude pyrazole-5-one was precipitated and was purified by recrystallisation from aqueous ethyl alcohol. Melting point 180° C.

EXAMPLE 2

*Preparation of 1-phenyl-3-carbethoxy-pyrazole-5-one (alternative method)*

The procedure of Example 1 was followed for the preparation of the diazonium solution, which was added to ethyl aceto succinate ($\frac{1}{10}$ mol) in 50 cc. ethyl alcohol, and 20 gms. of finely powdered anhydrous sodium acetate was added. An oil separated out and, after standing overnight, this was extracted with ether and the extracts dried over anhydrous sodium sulphate. The ether was distilled off and the residue diluted with 200 cc. water. It was then made alkaline, extracted with ether and the aqueous layer was separated. This was acidified with concentrated hydrochloric acid. The product separated and was recrystallised from aqueous ethyl alcohol. Melting point 180° C.

This example may be modified by using an equal weight of sodium carbonate or borax instead of the sodium acetate.

EXAMPLE 3

*Preparation of 1-phenyl-3-carbethoxy-pyrazole-5-one (alternative method)*

Aniline ($\frac{1}{10}$ mol) was diazotised as in Example 1 and the diazonium solution added to a solution of ethyl acetosuccinate ($\frac{1}{10}$ mol) in 200 cc. 50% aqueous pyradine solution. The reaction mixture was allowed to stand and then heated for one hour on the water bath. After cooling the product was filtered off and recrystallised from aqueous ethyl alcohol. Melting point 177° C.

This example may be modified by using triethylamine in place of pyridine with the same result.

EXAMPLE 4

*Preparation of 4,4'-diphenylene-bis-[3-carbethoxy pyrazole-5-one-1]*

Benzidine (1/20 mol) was warmed with 25 cc. concentrated hydrochloric acid and then cooled. An equal volume of water was then added and the solution was tetrazotised by the addition of a solution of sodium nitrite ($\frac{1}{10}$ mol), the solution being kept cool and stirred. After half an hour's stirring the solution was added to a solution of ethyl aceto succinate ($\frac{1}{10}$ mol) in 60 cc. of sodium hydroxide solution (2.5 N). The solution was then filtered to remove azo dye also formed and the filtrate was acidified. The crude pyrazolone compound separated and was recrystallised from ethyl alcohol solution. Melting point 244–246° C. with decomposition.

EXAMPLE 5

*Preparation of 4,4'-diphenylene-bis-[3-carbethoxy pyrazole-5-one-1]*

The procedure of Example 3 was followed using tetrazotised benzidine (1/20 mol) instead of diazotised aniline. The pyrazolene was isolated and recrystallised from aqueous ethyl alcohol. Melting point 250° C. with decomposition.

EXAMPLE 6

*Preparation of 1-phenyl-3-carbmethoxy pyrazole-5-one*

The procedure of Example 2 was followed using ethyl methylacetosuccinate (from methylacetoacetate and ethyl chloracetate) in place of ethyl acetosuccinate. The product was purified by crystallising from methyl alcohol. Melting point 196° C.

EXAMPLE 7

*Preparation of 1-phenyl-3-acetyl pyrazole-5-one*

The procedure of Example 3 was followed using ethyl-$\beta\beta$-diacetyl propionate (March, Compt. Rend., vol. 130, page 1193) in place of ethyl acetosuccinate. The oil first formed was warmed for 30 minutes at 60° C. with 5% sodium carbonate solution. The product was isolated by acidifying the carbonate solution. It was recrystallised from aqueous ethyl alcohol. Melting point 118° C.

EXAMPLE 8

*Preparation of 1-phenyl-3-carboxylic acid pyrazole-5-one*

The procedure of Example 3 was followed using ethyl cyansuccinate (Haller and Barthe, Compt. Rend., vol. 106, page 1413) in place of ethyl acetosuccinate. The crude reaction product was heated for 20 minutes on a boiling water-bath with 10% sodium hydroxide solution to effect ring closure and hydrolysis of the cyano group to the corresponding acid. After cooling and acidifying, the product was filtered off and purified by crystallising from acetic acid. Melting point 240° C. with decomposition.

EXAMPLE 9

*Preparation of 1-phenyl-3-carboxylic acid pyrazole-5-one (alternative method)*

The procedure of Example 3 was followed using ethyl ethane-$\alpha\alpha\beta$-tricarboxylate (Bischoff, Annalen, vol. 214, page 38) in place of ethyl acetosuccinate. The crude reaction product was heated with sodium hydroxide and the product isolated as in Example 8. Melting point 241° C. with decomposition.

Example 10

Preparation of 1-phenyl pyrazole-5-one-3-carboxylic acid-o-chloranilide

The procedure of Example 2 was followed using ethyl acetosuccinate-o-chloranilide in place of ethyl acetosuccinate. The product was isolated in an anlogous manner. Melting point 82° C. after recrystallisation from aqueous ethyl alcohol.

Ethyl acetosuccinate-o-chloranilide is made by reacting equimolecular proportions of sodio acetoacet-o-chloranilide with ethyl chloracetate in ethyl alcohol. The solution is heated until neutral, filtered, excess alcohol distilled off and the residue poured into water. The oily product obtained is dissolved in ether, extracted with 2% sodium carbonate solution and the extracts acidified and filtered. The precipitated compound is recrystallised from benzene, melting point 156° C.

Example 11

Preparation of 1-α-naphthyl-3-carboxylic acid pyrazole-5-one

α-napthylamine ($\frac{1}{10}$ mol) was dissolved in 50 cc. dilute hydrochloric acid (5 N) and diazotised by adding an aqueous solution of sodium nitrite ($\frac{1}{10}$ mol) with cooling and stirring. The diazonium solution was added to a solution of ethyl acetosuccinate ($\frac{1}{10}$ mol) in 50 cc. ethyl alcohol followed by anhydrous sodium acetate (¼ mol). After standing, the oily product was heated on the water-bath with 5% sodium hydroxide solution. After cooling the product was isolated by acidification followed by filtration. It was purified by crystallising from aqueous ethyl alcohol. Melting point 264° C. with decomposition.

Example 12

Preparation of 1-β-naphthyl-3-carboxylic acid pyrazole-5-one

The procedure of Example 11 was followed using β-naphthylamine in place of α-naphthylamine. The product was recrystallised from aqueous ethyl alcohol. Melting point 214° C. with decomposition.

Example 13

Preparation of 1-p-sulphonamidophenyl-3-carbethoxy pyrazole-5-one

The procedure of Example 3 was followed using p-amino-benzenesulphonamide in place of aniline. The product was recrystallised from ethyl alcohol. Melting point 197° C.

Example 14

Preparation of the compound of the probable formula:

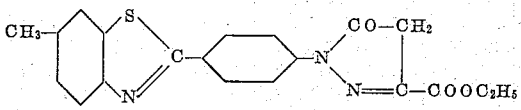

Dehydrothio-p-toluidine ($\frac{1}{10}$ mol) was warmed with 50 cc. dilute hydrochloric acid (5 N) and the solution cooled to 0° C. The solution was diazotised by adding an aqueous solution of sodium nitrite ($\frac{1}{10}$ mol). The diazonium solution was added with cooling and stirring to a solution of ethyl acetosuccinate ($\frac{1}{10}$ mol) in 200 cc. 50% aqueous pyridine solution. The oily product was extracted with ether and the ether distilled off. The residue was heated for half an hour on a boiling water-bath with 5% sodium carbonate solution. After cooling the product was isolated by acidifying and filtration, and purified by crystallising from ethyl alcohol. Melting point 282° C.

Example 15

Preparation of 1-p-carboxyphenyl-3-carbethoxy pyrazole-5-one p-aminobenzoic acid ($\frac{1}{10}$ mol) was dissolved in 100 cc. N sodium carbonate solution and sodium nitrite ($\frac{1}{10}$ mol) added. The solution was then poured into a mixture of concentrated hydrochloric acid (30 cc.) and ice (50 gm.). After standing for one hour the suspension of the diazonium salt was added to a solution of ethyl acetosuccinate ($\frac{1}{10}$ mol) in 200 cc. of 50% aqueous pyridine. After standing four hours the solution was acidified and the product filtered off and recrystallised from aqueous ethyl alcohol. Melting point 152° C.

Example 16

Preparation of 1-p-sulphophenyl-3-carboxylic acid pyrazole-5-one

Sulphanilic acid ($\frac{1}{10}$ mol) was dissolved in 200 cc. sodium carbonate solution (½ N) and sodium nitrite ($\frac{1}{10}$ mol) added. The solution was poured into a mixture of 20 cc. concentrated hydrochloric acid and 100 gm. ice. After standing for half an hour the suspension of diazosulphonate was added to a solution of ethyl acetosuccinate ($\frac{1}{10}$ mol) in 100 cc. 50% aqueous pyridine. 1-p-sulphophenyl-3-carbethoxy pyrazole-5 - one was isolated by adding sodium chloride. This pyrazolone was heated with 20% sodium hydroxide solution to hydrolyse the ester group. The product was isolated as the di-sodium salt by evaporating the solution to dryness. Melting point above 270° C.

Example 17

Preparation of 1-p-nitrophenyl-3-carbethoxy pyrazole-5-one p-Nitraniline ($\frac{1}{10}$ mol) was heated with concentrated hydrochloric acid (30 cc.) and the solution rapidly cooled to 0° C. The suspension of the p-nitraniline hydrochloride was diazotised by adding an aqueous solution of sodium nitrite ($\frac{1}{10}$ mol) with stirring. After standing for half an hour the diazonium solution was added to a solution of ethyl acetosuccinate ($\frac{1}{10}$ mol) in 200 cc. 50% aqueous pyridine. The oil first formed solidified on standing overnight, and was filtered off. This solid was then heated for 15 minutes on a boiling water-bath with 250 cc. N sodium carbonate solution. After cooling and filtering from a little impurity, the solution was acidified to obtain the product. This was filtered off and washed with water. Melting point 228° C.

What we claim is:

1. Process for the production of pyrazole-5-ones which comprises reacting a diazonium compound with a compound of the general formula

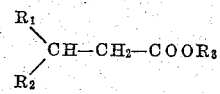

where $R_1$ and $R_2$ are organic groupings each selected from the class consisting of —COOR, —CN, —COR and —CO.NHR where R and $R_3$ are selected from the class consisting of hydrogen and hydrocarbon groups, the said reaction being effected in the presence of a strong base, the quantity of diazonium compound being less than two molecular equivalents per molecular equivalent of the compound of the said formula, separating the diazo compound formed, allowing it to stand to permit molecular re-arrangement, and recovering the pyrazole-5-one formed.

2. Process for the production of pyrazole-5-ones which comprises reacting a diazonium compound with a compound of the general formula

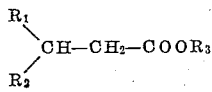

where $R_1$ and $R_2$ are organic groupings each selected from the class consisting of —COOR, —CN, —COR and —CO.NHR where R and $R_3$ are selected from the class consisting of hydrogen and hydrocarbon groups, the said reaction being effected in the presence of a weak base and completed in the presence of a stronger base, approximately equimolecular quantities of the reactants being employed, separating the product obtained and allowing it to stand to permit molecular re-arrangement.

3. Process for the production of pyrazole-5-ones which comprises reacting a diazonium compound with a compound of the general formula

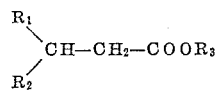

where $R_1$ and $R_2$ are organic groupings each selected from the class consisting of —COOR, —CN, —COR and —CO.NHR where R and $R_3$ are selected from the class consisting of hydrogen and hydrocarbon groups, the said reaction being effected in the presence of a strong base, approximately equimolecular quantities of the reactants being employed, separating the product obtained and allowing it to stand to permit molecular re-arrangement.

4. Process for the production of pyrazole-5-ones which comprises reacting a tetrazotised diamine with a compound of the general formula

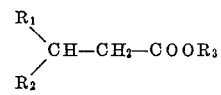

where $R_1$ and $R_2$ are organic groupings each selected from the class consisting of —COOR, —CN, —COR and —CO.NHR where R and $R_3$ are selected from the class consisting of hyrogen and hydrocarbon groups, the said reaction being effected in the presence of a weak base and completed in the presence of a stronger base, approximately two molecular quantities of the compound of the said formula being employed per molecular quantity of the tetrazotised diamine, separating the product obtained and allowing it to stand to permit molecular re-arrangement.

5. Process for the production of pyrazole-5-ones which comprises reacting a tetrazotised diamine with a compound of the general formula

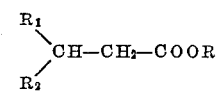

where $R_1$ and $R_2$ are organic groupings each selected from the class consisting of —COOR, —CN, —COR and —CO.NHR where R and $R_3$ are selected from the class consisting of hydrogen and hydrocarbon groups, the said reaction being effected in the presence of a strong base, approximately two molecular quantities of the compound of the said formula being employed per molecular quantity of the tetrazotised diamine, separating the product obtained and allowing it to stand to permit molecular re-arrangement.

6. Process for the production of pyrazole-5-ones which comprises reacting a diazonium compound with a compound of the general formula

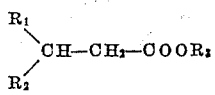

where $R_1$ and $R_2$ are organic groupings each selected from the class consisting of —COOR, —CN, —COR, and —CONHR where R and $R_3$ are selected from the class consisting of hydrogen and hydrocarbon groups, the said reaction being effected in the presence of a weak base, allowing the diazo compound formed to stand to permit molecular re-arrangement, and separating the pyrazole-5-one formed.

7. Process for the production of pyrazole-5-ones which comprises reacting a diazonium compound with a compound of the general formula

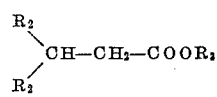

where $R_1$ and $R_2$ are organic groupings each selected from the class consisting of —COOR, —CN, —COR, and —CONHR where R and $R_3$ are selected from the class consisting of hydrogen and hydrocarbon groups, the quantity of diazonium compound being less than 2 molecular equivalents per molecular equivalent of the compound of the said formula, the said reaction being effected in the presence of a weak base, allowing the reaction mixture to stand in the presence of a stronger base, allowing the diazo compound to molecularly re-arrange and recovering a pyrazole-5-one.

8. Process for the production of pyrazole-5-ones which comprises reacting a diazonium compound with a compound of the general formula

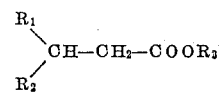

where $R_1$ and $R_2$ are organic groupings each selected from the class consisting of —COOR, —CN, —COR, and —CONHR where R and $R_3$ are selected from the class consisting of hydrogen and hydrocarbon groups, the quantity of diazonium compound being less than 2 molecular equivalents per molecular equivalent of the compound of the said formula, the said reaction being effected in the presence of a weak base, allowing the reaction mixture to stand in the presence of a stronger base at a temperature from room temperature to 100° C., allowing the diazo compound to molecularly re-arrange and recovering a pyrazole-5-one.

9. Process for the production of pyrazole-5-ones which comprises reacting a diazonium compound with a compound of the general formula

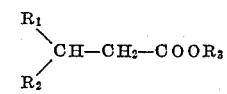

where $R_1$ and $R_2$ are organic groupings each selected from the class consisting of —COOR, —CN, —COR, and —CONHR where R and $R_3$ are selected from the class consisting of hydrogen and hydrocarbon groups, the said reaction being effected in the presence of a weak base, allowing the reaction mixture to stand at a temperature from room temperature to 100° C., allowing the diazo compound to molecularly re-arrange and recovering a pyrazole-5-one.

10. A compound of the formula
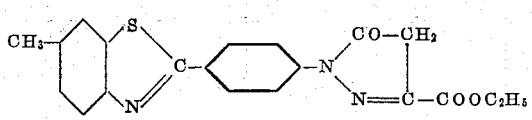
JOHN DAVID KENDALL.
DOUGLAS JAMES FRY.
REFERENCES CITED
The following references are of record in the file of this patent:
UNITED STATES PATENTS
| Number | Name | Date |
|---|---|---|
| 2,153,615 | Dahlen et al. | Apr. 11, 1939 |
| 2,294,909 | Jennings | Sept. 8, 1942 |
| 2,366,616 | Harrington | Jan. 2, 1945 |